Patented Nov. 15, 1932

1,888,044

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS OF OBTAINING RESINS OR RESIN LIKE BODIES FROM CRACKED HYDROCARBON PRODUCTS

No Drawing. Application filed January 6, 1928. Serial No. 245,042.

This invention relates to improvements in a process for recovering and making resinous bodies from oils, and refers more particularly to the utilization of resinous bodies derived from cracked distillates such as those produced in pressure distillation or destructive distillation of petroleum oils.

The invention further relates to the conversion of such resinous bodies into useful and marketable commercial products. Such gummy or resinous bodies may be recovered from cracked distillates by passing the cracked distillate in vapor form through a body of adsorbent material, such as fuller's earth, bentonite, infusorial earth, or the like, or by adding to the cracked distillate an adsorbent material such as fuller's earth, bentonite, infusorial earth, or the like, or by passing the cracked distillate through a bed of such adsorbent material. The resinous material is recovered from the adsorbent materials by treatment with a solvent such as alcohol, ether, carbon tetrachloride, chloroform, etc., or mixtures of these substances which dissolve the resinous materials. The latter may be separated from the solvent by distilling off the solvent.

The resinous material at this stage is then subjected to the simultaneous action of an oxidizing gas, such as air, oxygen, ozone, etc., and actinic rays or ultra-violet light. This causes a chemical conversion, resulting in the hardening of the gummy or resinous matter recovered directly from the cracked distillate, and the resinous matter may be subjected to the combined action of the actinic rays and oxidizing gas until a material of the desired properties as to viscosity or hardness is obtained. The resultant resinous materials may be used for lacquers, varnishes, insulating materials, moulded articles, etc.

In addition to the use of oxidizing agents, polymerizing agents, such as heavy metal salts and others, may be used to promote the hardening or resinification of the polymers recovered from the cracked distillates in conjunction with the oxidizing gas and the ultraviolet light.

In carrying out the process, while the oxidizing effect under the influence of ultraviolet light proceeds at an appreciable rate, it is best to carry out the process at an elevated temperature. Temperatures between 150° and 300° F., more or less, have been found satisfactory.

I am aware that it has been proposed heretofore in the prior art to recover or remove resinous bodies from cracked hydrocarbon distillate by treatment with adsorbent substances and subsequently subjecting the gummy or resinous material to the action of oxidizing agents. The novelty of the present invention resides in the use of ultraviolet light or actinic rays to promote the effect of the oxidizing gas in converting the gummy or soft resinous materials to harder resins, and results in a great saving in time and also in obtaining resins possessing characteristics which are desirable and not possessed by those heretofore made.

I claim as my invention:

1. A process of improving resin-like bodies obtained from cracked hydrocarbon distillates which comprises first removing said resinous bodies with an adsorbing material and separating the same from the absorbing material, and thereafter subjecting the removed bodies to the simultaneous action of an oxidizing agent and ultra-violet light.

2. A process such as described in claim 1 characterized in that the step of subjecting said resinous bodies to the simultaneous action of an oxidizing agent and ultra-violet light is carried out at an elevated temperature between 150° F. and 300° F.

3. A process for improving resins obtained from cracked hydrocarbon distillates by adsorbent material, which consists in subjecting said resinous extract to the simultaneous action of an oxidizing agent and ultra violet light, to produce a hardened product.

4. A process such as described in claim 3, characterized in that the simultaneous action of an oxidizing agent and ultra violet light is carried out at an elevated temperature between 150° F. and 300° F.

5. A process such as described in claim 3, characterized in that the simultaneous action of an oxidizing agent and ultra violet light is carried out in the presence of a polymerizing agent to promote the hardening of the polymers recovered from the cracked distillates.

6. A process for removing resinous material from cracked hydrocarbon distillates and for improving such resinous material which comprises treating the distillate with an adsorbing agent, then subjecting the adsorbing agent with the contained resinous material to the action of a solvent, removing the resinous material by evaporating the solvent, and subjecting the removed resinous material to the simultaneous action of an oxidizing agent and ultra violet light.

7. A process for improving resinous bodies obtained from hydrocarbon oils which comprises subjecting the same to the simultaneous action of an oxidizing agent and ultra violet light.

8. A process which comprises separating resinous bodies from cracked hydrocarbon distillates containing the same, and then subjecting said bodies to the simultaneous action of an oxidizing agent and ultra violet light.

In testimony whereof I affix my signature.

JACQUE C. MORRELL.